(12) United States Patent
Daigre

(10) Patent No.: US 7,908,960 B2
(45) Date of Patent: Mar. 22, 2011

(54) RETURN TO NEUTRAL MECHANISM FOR HYDRAULIC PUMP

(75) Inventor: Richard Daigre, Hopkinsville, KY (US)

(73) Assignee: White Drive Products, Inc., Hopkinsville, KY (US)

( * ) Notice: Subject to any disclaimer, the term of this patent is extended or adjusted under 35 U.S.C. 154(b) by 401 days.

(21) Appl. No.: 12/112,351

(22) Filed: Apr. 30, 2008

(65) Prior Publication Data

US 2008/0271444 A1   Nov. 6, 2008

Related U.S. Application Data

(60) Provisional application No. 60/915,284, filed on May 1, 2007.

(51) Int. Cl.
*F01B 3/00* (2006.01)

(52) U.S. Cl. .................................................. 92/12.2

(58) Field of Classification Search ............. 92/12.2; 60/487

See application file for complete search history.

(56) References Cited

U.S. PATENT DOCUMENTS

| | | | |
|---|---|---|---|
| 5,094,077 A | 3/1992 | Okada | |
| 5,119,632 A * | 6/1992 | Nishimura et al. | 60/487 |
| 5,495,712 A | 3/1996 | Yano et al. | |
| 6,199,380 B1 | 3/2001 | Ishii | |
| 6,425,244 B1 | 7/2002 | Ohashi et al. | |
| 6,782,797 B1 | 8/2004 | Brandenburg et al. | |
| 7,234,385 B2 | 6/2007 | Dong et al. | |
| 7,458,311 B2 * | 12/2008 | Korthals | 92/12.2 |
| 2001/0027650 A1 | 10/2001 | Shimizu et al. | |
| 2006/0016185 A1 * | 1/2006 | Berg et al. | 60/487 |

* cited by examiner

*Primary Examiner* — F. Daniel Lopez
(74) *Attorney, Agent, or Firm* — Rankin Hill & Clark LLP

(57) ABSTRACT

A return to neutral mechanism includes a hub, a lever and a biasing member. The hub is configured to connect fast to a control rod of an associated hydraulic pump. The lever connects to the hub and includes a location configured to connect to an associated linkage that is connected to an associated steering mechanism. The biasing member connects to the lever for biasing the lever and the control rod toward a neutral position.

18 Claims, 8 Drawing Sheets

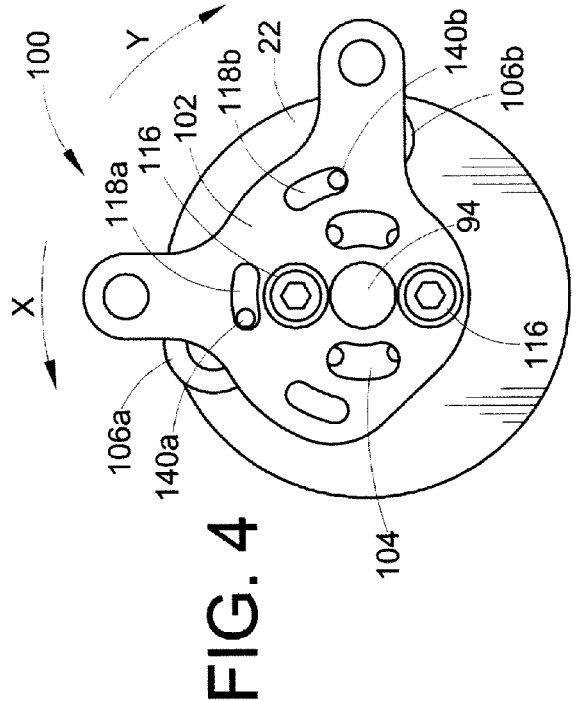
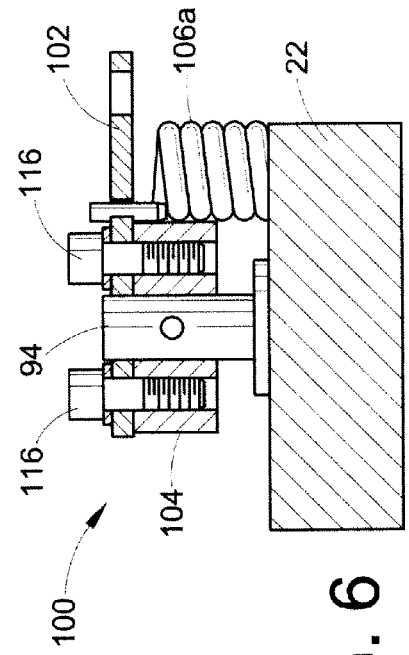
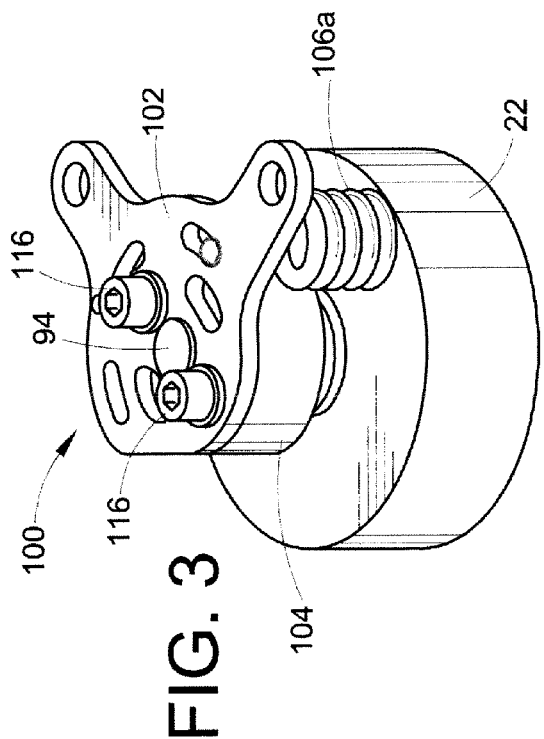
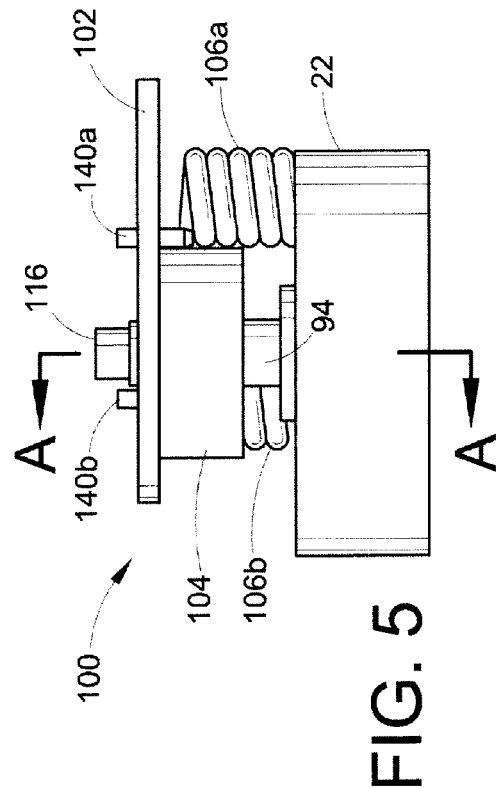

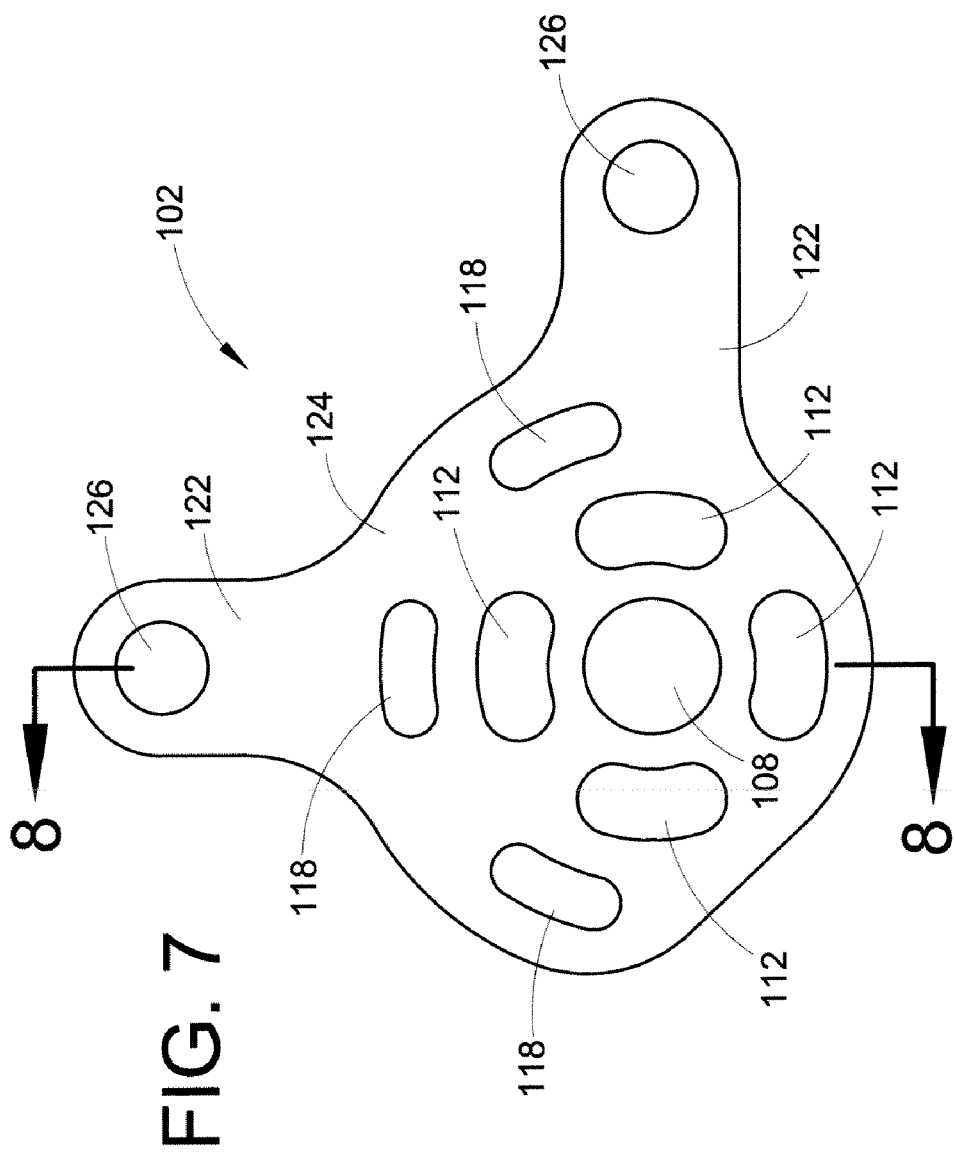

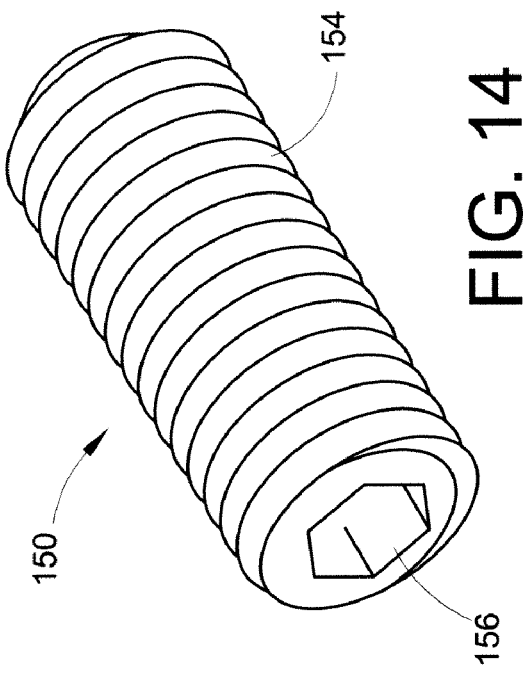
FIG. 14
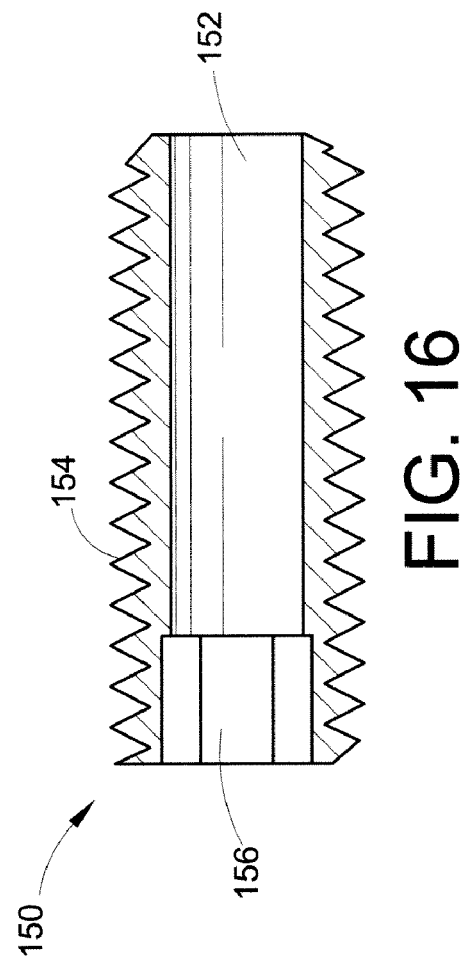
FIG. 16
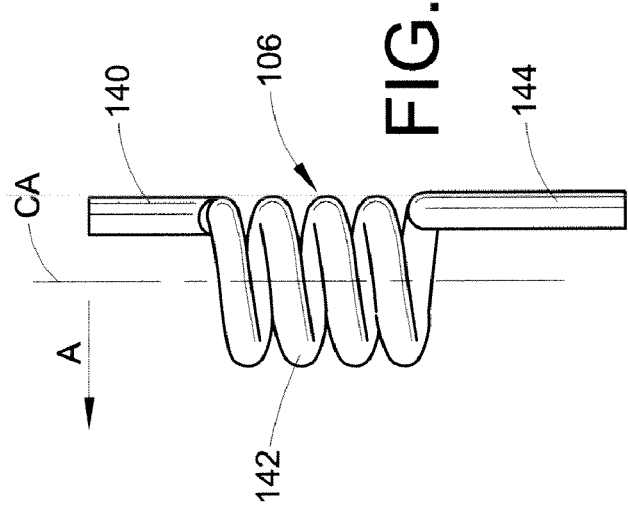
FIG. 13
FIG. 15

RETURN TO NEUTRAL MECHANISM FOR HYDRAULIC PUMP

This application claims the benefit of provisional patent application Ser. No. 60/915,284, filed May 1, 2007, which is incorporated by reference in its entirety herein.

BACKGROUND

Hydraulically controlled gear driven drive axles are an efficient way of controlling the speed and direction of land vehicles, such as walk behind and ride-on lawnmowers, ATVs, and tractors. The axles are driven by a hydraulic motor, which receives pressurized hydraulic fluid from a hydraulic pump. The direction of rotation of the hydraulic motor and the rotational speed of the output shaft of the motor is a function of the operation of the fluid pump that is in communication with the hydraulic motor.

The operator of the vehicle controls the output from the hydraulic pump using controls, e.g. levers and the like. Return of the pump to a neutral position, a position in which the pump does not deliver pressurized fluid to the hydraulic motors, is desirable when the controls are not being operated by the operator of the vehicle. Known return-to-neutral mechanisms for hydraulic pumps are large and complicated.

SUMMARY OF THE INVENTION

A return to neutral mechanism that overcomes the aforementioned shortcomings includes a lever, a hub and a biasing member. The lever is configured to cooperate with a control rod of an associated hydraulic pump such that movement of the lever results in rotation of the control rod. The hub is configured to connect fast with the control rod for rotation therewith. The hub connects to the lever in a manner to allow for adjusting the lever with respect to the hub prior to fixing the hub with respect to the lever so that the hub rotates in response to movement of the lever. The biasing member contacts the lever for biasing the control rod toward a neutral position when the control rod has been moved from the neutral position.

A method for attaching a return to neutral mechanism to a control arm of a hydraulic pump includes operating a hydraulic pump in neutral, connecting a hub fast to a control arm of the hydraulic pump such that the hub rotates with the control arm, placing a lever on the hub, contacting a biasing member with the lever, allowing the control arm to return to a neutral position so that the hydraulic pump is operating in neutral, and fixing the lever to the hub so that rotation of the lever results in rotation of the hub and the control arm.

Another example of a return to neutral mechanism that overcomes the aforementioned shortcomings includes a hub, a lever and a biasing member. The hub is configured to connect fast to a control rod of an associated hydraulic pump. The lever connects to the hub and includes a location configured to connect to an associated linkage that is connected to an associated steering mechanism. The biasing member contacts the lever for biasing the lever and the control rod toward a neutral position.

BRIEF DESCRIPTION OF THE DRAWINGS

FIG. 3 is a perspective view of a return-to-neutral mechanism for use with the pump unit depicted in FIGS. 1 and 2.

FIG. 4 is a top plan view of FIG. 3.

FIG. 5 is a side elevation view of FIG. 3.

FIG. 6 is a cross-sectional view taken along line A-A of FIG. 5.

FIG. 7 is a top plan view of a lever of the return-to-neutral mechanism depicted in FIGS. 3-6.

FIG. 8 is a cross-sectional view taken along line 8-8 in FIG. 7.

FIG. 13 is an elevation view of a spring of the return-to-neutral mechanism depicted in FIGS. 3-6.

FIG. 14 is a perspective view of a set screw for the return-to-neutral mechanism depicted in FIGS. 3-6.

FIG. 15 is an end elevation view of FIG. 14.

FIG. 16 is a longitudinal cross-sectional view of FIG. 14.

DETAILED DESCRIPTION

A hydrostatic transmission assembly for a ground vehicle, for example a riding zero-turn mower, a walk-behind commercial lawn mower, garden tractor, an all-terrain vehicle, or a small self-contained tracked backhoe, uses a combination of components to provide a reliable, smooth, easy to control, high-torque power delivery package.

Figure 1:
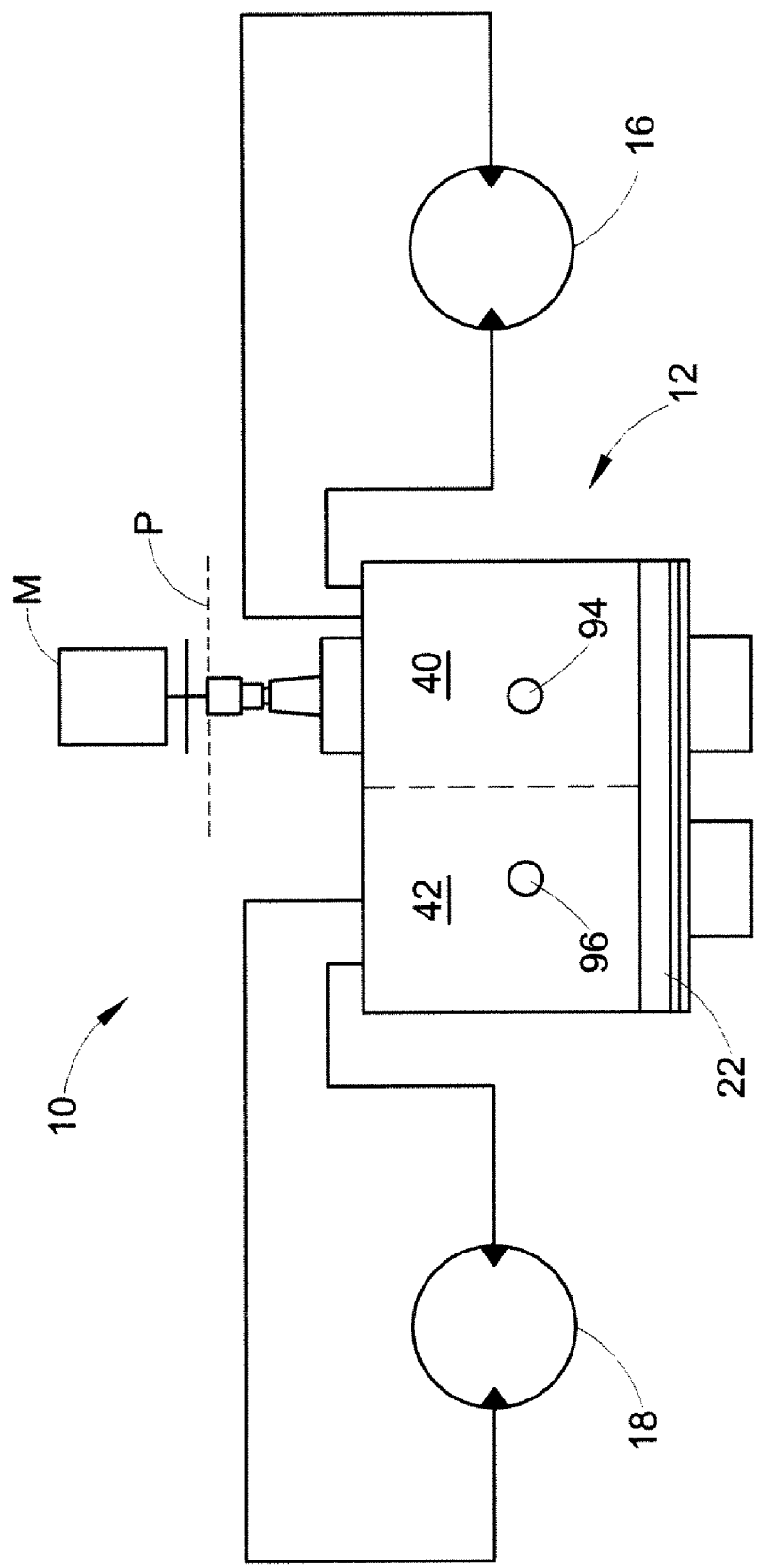
FIG. 1 is a schematic view of a hydrostatic transmission for a vehicle.

With reference to FIG. 1, an example of such a transmission assembly 10 includes a pump unit 12, a first hydraulic power unit, e.g. a hydraulic motor 16, and a second hydraulic power unit, e.g. a hydraulic motor 18. The hydraulic motors 16 and 18 independently drive wheels (not shown) to propel the vehicle in a forward and backward direction. The transmission 10 depicted in FIG. 1 is just one example of a transmission where the later described return-to-neutral mechanism would be useful. Moreover, the pump unit 12 depicted in the figures is known as a dual pump apparatus; however, the return-to-neutral mechanism that is described in more detail below can be used with a dual pump apparatus and a single pump apparatus, as well as a multiple pump apparatus. The number of pumping mechanisms located in the pump is not important to the invention.

Figure 2:
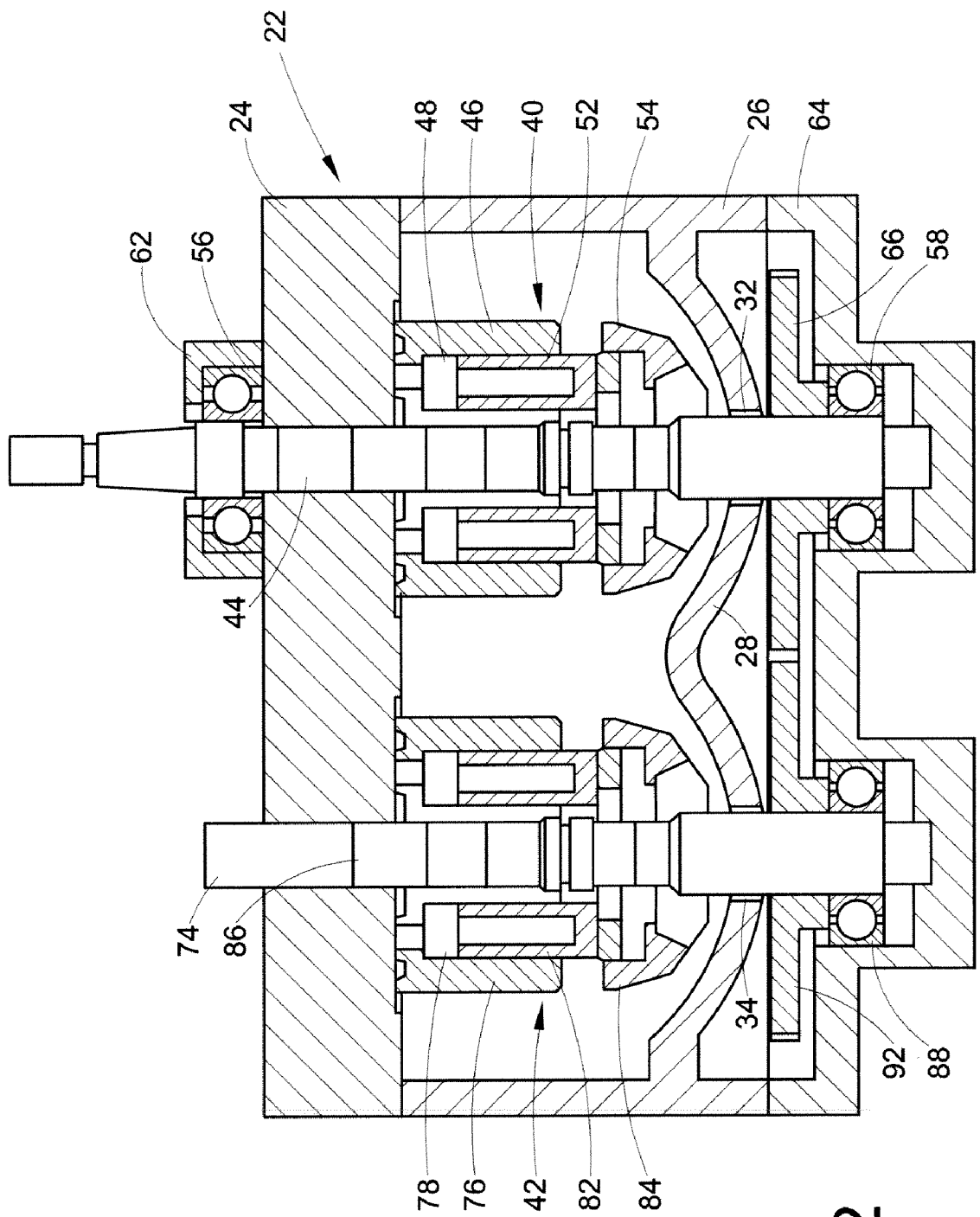
FIG. 2 is a side view of the pump unit of the hydrostatic transmission assembly of FIG. 1 with a portion shown in cross-section.

The pump unit 12 depicted in FIG. 2 includes a pump housing 22, which in this particular embodiment includes an upper plate 24 attached to a lower housing portion 26. The pump housing 22 in the depicted embodiment takes a generally rectangular box-like configuration. A curved internal wall 28 is located in the lower housing portion 26 and includes a first opening 32 and a second opening 34. The pump housing 22 houses components of a first pump 40 and a second pump 42, which in the depicted pump unit 12 are variable displacement pumps.

The first pump 40 includes a driven shaft 44 that is driven by a motor M (FIG. 1, depicted schematically). The motor M can be the motor, e.g. engine, that drives the vehicle as well as other components of the vehicle, for example mower blades, and the like. The motor M can operatively drive the driven shaft 44 through a transmission (not shown).

A rotatable cylinder block 46 connects to the driven shaft 44 so that the block 46 rotates with the shaft. The rotatable cylinder block 46 includes a plurality of chambers 48 that receive spring loaded pistons 52. A swash plate 54 contacts the pistons 52 to vary the pump chamber volume in each chamber 48. The swash plate 54 pivots about the rotational axis of the driven shaft 44. Bearings, e.g. an upper bearing 56 and a lower bearing 58 support the driven shaft 44. The upper bearing 56 is disposed on an opposite side of the upper plate 24 as the rest of the components of the first pump 40. As depicted, a bearing cap 62 mounts over the upper bearing 56 and connects to the upper plate 24 to protect the bearing. Likewise, a lower plate member 64 having a recess that receives the lower bearing 58 attaches to the lower housing portion 26. The lower bearing 58 is disposed on the opposite side of the internal wall 28 as the remainder of the components first pump 40.

The driven shaft 44 extends through the first opening 32 in the internal wall 28. The driven shaft 40 connects to a first circular gear 66. The first circular gear 66 is sandwiched between the lower bearing 58 and the internal wall 28 of the lower housing portion 26. Accordingly, the first driven gear 66 is separated from the remainder of the components of the first pump 40.

The second pump 42 has a very similar configuration to the first pump 40. The second pump 42 includes a driven shaft 74 that drives a cylinder block 76. The cylinder block 76 includes a plurality of chambers 78 that receive spring loaded pistons 82. A swash plate 84 contacts the spring-loaded pistons 82. The swash plate 84 can be displaced by being pivoted about the axis of rotation of the driven shaft 74 to vary the volume of the pump chamber defined in each chamber 78 of the cylinder block 76. The driven shaft 74 is also supported by bearings: an upper sleeve bearing 86 and a lower ball bearing 88, the lower ball bearing 88 being separated from the remainder of the components of the second pump 42 via the intermediate wall 28. The lower plate member 64 also includes a recess for receiving the lower ball bearing 88.

A circular gear 92 connects to the driven shaft 74. The circular gear 92 is disposed on an opposite side of the intermediate wall 28 as the remainder of the components of the second pump 42. The second gear 92 engages the first circular gear 66. Each gear 66 and 92 has the same diameter so that rotation of the first gear 66 at a first speed results in the rotation of the second gear 92 at the same speed. Accordingly, rotation of the first drive shaft 44 results in the rotation of the second driven shaft 74 at the same speed (but an opposite rotational direction) as the first driven shaft. The gears 66 and 92 in the depicted embodiment are made of powdered metal, and provide for an efficient connection between the first driven shaft 44 and the second drive shaft 74. Gears 66 and 92 allow for a common rotation motor M for the transaxle assembly. If desired, an intermediate gear can be disposed between the first gear 66 and the second gear 92 so that rotation of the first gear 66 in a first rotational direction results in rotation of the second gear 92 in the same rotational direction. Angular displacement of the swash plates 54 and 84 is controlled by control members, e.g., rods 94 and 96 (FIG. 1). Angular adjustment of the first swash plate 54 is controlled by control member 94 and the angular displacement of the second swash plate 84 is controlled by the control member 96. The operator of the vehicle can alter the volumetric output and directional output of each individual pump by manipulating the control member, which is also known as a control rod or a trunnion arm, in a manner that is known in the art.

With reference back to FIG. 1, the pump 40 operates to drive the first hydraulic motor 16 through fluid lines that are connected to A and B ports located in the pump housing and in communication with the pump chambers 48 (FIG. 2). Likewise, the second pump 42 operates to supply pressurized hydraulic fluid to the second hydraulic motor 18 through fluid ports A and B that are found in the pump housing 22 and are in communication with the pump chambers 78 of the second pump 42. Such a connection is generally known in the art.

FIG. 3 depicts a return-to-neutral mechanism 100 for returning a control rod back to neutral. FIG. 3 depicts a portion of the pump housing 22 (depicted as a cylindrical member) with the control rod 94 (see also FIG. 1) extending through the housing. The control rod 96 (FIG. 1) would be operated in the same manner, and for the sake of brevity will not be described in more detail. As discussed above, the control rod 94 interfaces with the swash plate 54 (FIG. 2) to control the direction of flow of fluid through the pump 40 (FIG. 2) and the pressure at which the fluid is being delivered from the pump, which is a function of the size of the pump chambers 48 at a particular instance in time.

The return-to-neutral mechanism 100 includes a lever 102, a hub 104 and a biasing member. In the depicted embodiment, two biasing members are provided: first biasing member 106a and second biasing member 106b (see FIGS. 4 and 5).

Figure 9:
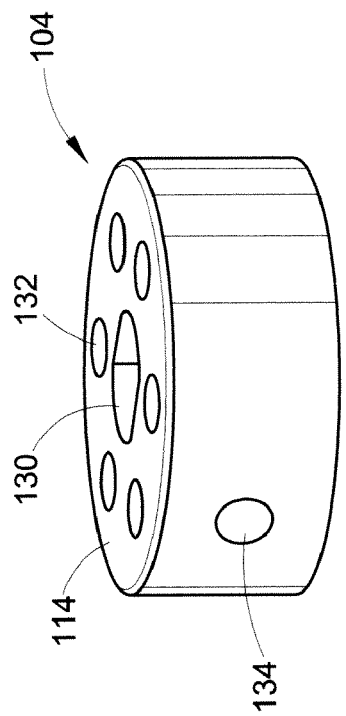
FIG. 9 is a perspective view of a hub for the return-to-neutral mechanism depicted in FIGS. 3-6.
Figure 12:
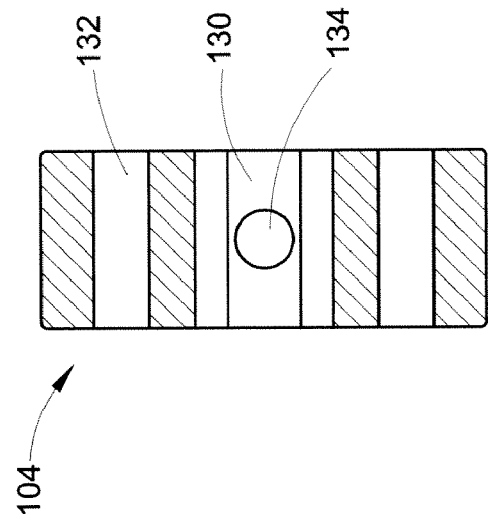
FIG. 12 is a cross-sectional view taken along line 12-12 of FIG. 11.
Figure 10:
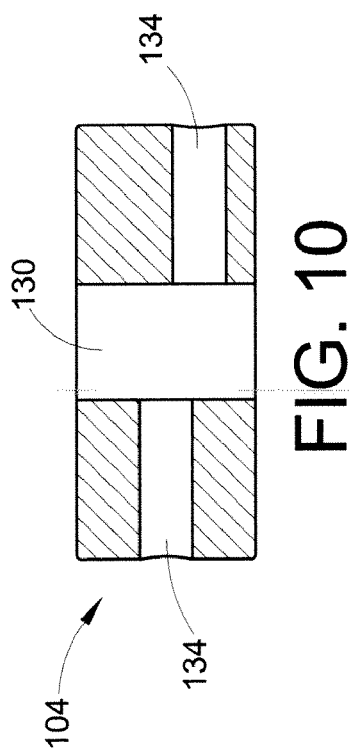
FIG. 10 is a cross-sectional view taken along line 10-10 in FIG. 11.
Figure 11:
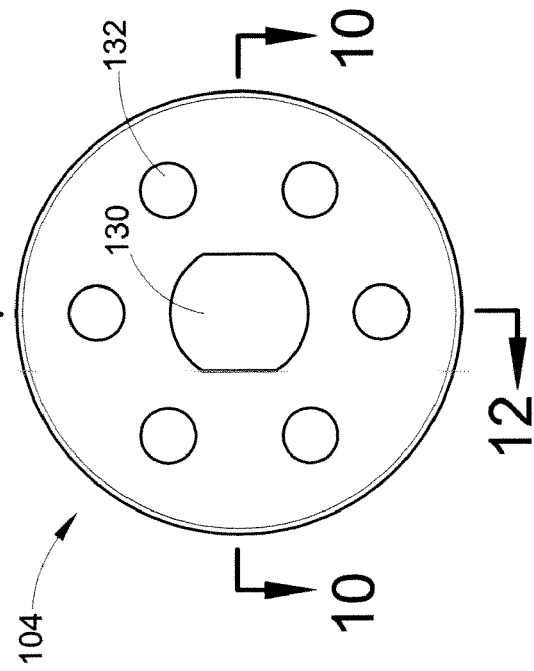
FIG. 11 is a top plan view of FIG. 9.

With reference to FIG. 7, the lever 102 is configured to cooperate with the control rod, e.g. control rod 94, of a hydraulic pump, e.g. hydraulic pump 12, such that movement of the lever results in rotation of the control rod. The lever 102 includes an axially centered central opening 108 that receives the control rod 94, which interfaces with the swash plate 54. An extension may need to be provided on the control rod so that the lever 102 (and the hub 104) can receive the extension to connect to the control rod. Alternatively, the lever 102 can simply connect to the hub 104 and not include an opening that receives the control rod. Fastener slots, four slots 112 are shown in the figures, are radially offset from the central opening 108 and angularly spaced from one another (about 90 degrees on center). The fastener slots 112 are generally oblong with their centers generally following a constant radius (see FIG. 7) with respect to the center of the central opening 108. The lever 102 rests on, e.g. contacts, an upper face 114 (FIG. 9) of the hub 104 and connects to the hub 104 using fasteners 116 (FIG. 3) that are received in the respective fastener slots 112 extending through the lever (see FIG. 8).

The lever 102 also includes biasing member openings 118, three openings are shown in the figures, that are radially offset from the central opening 108 and angularly spaced from one another. The biasing member openings 118 are spaced radially further from the central opening 108 than the fastener slots 112. The biasing member openings 118 are generally oblong slots with their centers generally following a constant radius (see FIG. 7) with respect to the center of the central opening 108. Two of the biasing member openings 118 have longitudinal ends that are spaced roughly 180 degrees from one another around the respective circumference defined by the radius that the biasing member openings are spaced from the center of the central opening 108. This allows the lever 102 to be flipped (the lever 102 would be oriented as a mirror image of FIG. 7) to operate with the other control rod 96 (see FIG. 1). The third biasing member opening 118 is midway between the aforementioned two openings around the circumference. With these multiple slots, different pumps can use the same components. The springs can bias in different directions (i.e. other side of the slot used) depending on the pump mounting hole configuration. In addition, the hub and lever can be flipped to vary the lever direction and height from the pump allowing the use of differing spring heights and differing pump rod lengths.

The lever 102 includes a location configured to connect to a linkage that is connected to a steering mechanism of the prime mover that incorporates the hydraulic pump 12. Lever arms 122 extend radially outward from a generally circular body portion 124 of the lever 102. Distal openings 126 are provided at a distal end of each arm 122, respectively. The distal openings 126 provide an attachment location for attaching to a handle (not shown) through some sort of connection linkage (also not shown). The handle, or other steering device, is used to control the steering and speed of the vehicle. Bolts or hooks could also be provided at the attachment location for attaching to a handle through some sort of connection linkage. Movement of the handle, or other steering device, by the operator will result in movement of the respective swash plate to control the direction and speed of the motor 16 that is in communication with the pump 40 of the pump unit 12. The return-to-neutral control mechanism 100 can also be used with other types of devices and should not be limited to only a device having handles used to control steering and speed of a vehicle, i.e. a zero-turn mower.

With reference to FIGS. 9-12, the hub 104 is configured to connect fast with the control rod for rotation therewith. Also, the hub 104 connects to the lever 102 in a manner to allow for adjusting the lever with respect to the hub prior to fixing the hub with respect to the lever so that the hub rotates in response to movement of the lever. The hub 104 includes an axially centered central opening 130 extending through the hub having flattened sides that engage flattened sides of the control arm 94 so that rotation of the hub 104 results in rotation of the control arm. Other types of connection would also apply (i.e. round hole in hub with set screw hitting flat on the control rod). The hub 104 also includes axial openings 132 that extend through the hub to receive the fasteners 116 to attach the lever 102 to the hub. The fastener openings 132 are radially spaced from the central opening 130 and align with some of the fastener slots 112 in the lever 102. The fastener openings 132 are equally spaced around a circumference defined by the radius at which the fastener opening centers are spaced from the center of the central opening 130. In the depicted embodiment, six fastener openings are provided. The six openings 132 in the hub 104 and the oblong slots 112 in the lever 102 make connecting the lever 102 to the hub 104 easier and also aid in "centering" the return-to-neutral mechanism, which will be described in more detail below.

The hub 104 also includes radial openings 134 that extend from a peripheral edge of the hub through to the central opening 130. The radial openings 134 receive fasteners (not shown) to fix the location of the hub in an axial direction on the control arm 94, and may also fix rotation when using non-flat sides in the hub (i.e. round center hole in hub).

The biasing members 106a and 106b, which in the depicted embodiment are coil springs, bias the lever 102, and thus the control rod, toward a neutral position, i.e. a position where pressurized fluid is not being delivered (or very little pressure is being delivered) to the hydraulic motors. FIG. 13 shows a spring 106 (the springs 106a and 106b have the same configuration, but may differ in coil wind direction—right hand or left hand coiled), which is a helical extension type spring having an upper extension 140 that extends vertically upward from a central coiled portion 142 and a lower extension 144 that extends vertically downward from the central coiled portion 142. Different than a typical extension spring, the springs 106a and 106b in the depicted embodiment act as a sort of cantilever beam—the lower extension 144 is fixed in the pump housing 22 while the upper extension 140 moves in a direction that is perpendicular to the coil axis CA (see arrow A which depicts the movement of the upper extension with respect to the lower extension) of the spring 106.

With reference to FIGS. 14-16, a spring set screw 150 is received in a threaded opening (not shown in the figures) of the pump housing 22 and includes a central axial passage 152 to receive the lower extension 144 of the spring 106. The spring set screw 150 is made from a hardened material, e.g. steel, so that the lower extension 144 of the springs 106 do not contact the aluminum pump housing 22. The spring set screw 150 includes external threads 154 that engage internal threads of the housing 22 and a hex-shaped opening 156 to facilitate insertion into and removal of the set screw 150 from the pump housing 22.

With reference back to FIG. 4, the upper extensions 140a and 140b of the springs 106a and 106b are received in separate biasing member openings 118a and 118b, respectively. The first spring 106a biases the lever 102 in a first rotational direction (counterclockwise) as shown by arrow X and the second spring 406b biases the lever 102 in a second rotational direction (clockwise) as shown by arrow Y about the rotational axis of the lever 102, which is coaxial with the rotational axis of the control arm 94.

Accordingly, when the lever 102 is rotated in the clockwise direction (arrow Y), which is accomplished by the operator moving the handle (or other device) in a first direction (for example to move the vehicle in a forward direction) the upper extension 140b of the second spring 106b no longer biases the lever 102 (the end of the fastener slot 118b moves clockwise) and the second spring 106b relaxes while the first spring 106a extends. If the clockwise force is removed, e.g. if the operator lets go of the handle, then the first spring 106a biases the lever 102 in a counterclockwise direction (arrow X) to return the lever 102, and thus the pump 40, (FIG. 1) to a neutral position. Similarly, when the lever 102 is rotated in the counterclockwise direction (arrow X), which is accomplished by the operator moving the handle (or other steering device) in a second direction (for example to move the vehicle in a reverse direction) the upper extension 140a of the first spring 106a no longer biases the lever 102 (the end of the fastener slot 118a moves counterclockwise) and the first spring 106a relaxes while the second spring 106b extends. If the counterclockwise force is removed, then the second spring 106b biases the lever 102 in a clockwise direction (arrow Y) to return the pump 40 (FIG. 1) to a neutral position. Because the fastener slots 118 are oblong, the springs 106a, 106b need only deflect in one direction so that the springs do not fatigue as quickly as compared to a spring that would deflect in two directions. Nevertheless, the return-to-neutral mechanism could be made with only one spring that deflected in opposite rotational directions. If the return-to-neutral mechanism employs only one spring, the slots 118 would be smaller so that the extensions 140 of the spring snugly fit inside the slots. The spring would bias the lever in both directions. Multiple springs could also be used, each biasing the lever in two rotational directions. Additionally, since the springs 106a and 106b bias in opposite directions, initial movement of the vehicle is not as "jerky" and the vehicle does not "jump" when going from forward to reverse.

Because of the design of the return-to-neutral mechanism 100, "centering" the return-to-neutral mechanism 100 is easily accomplished. The pump unit 12 to which the return-to-neutral mechanism 100 attaches self centers, i.e. operates in neutral, when the control rods 94 and 96 are not under a load, e.g. are not being rotated by an external force. Accordingly, with the motor M (FIG. 1) operating and rotating the driven shaft 44 of the first pump 40 (FIG. 1), the swash plates 54 and 84 will center to the neutral operating position. With the swash plates 54 and 84 in the neutral position, the lower extension 144 of each spring 106a and 106b is inserted into the respective spring set screw 150 in the pump housing 22. The hub 104 is then slid over the control rod 94 (another return-to-neutral mechanism can be mounted to the other control rod 96 in the same manner and therefore will not be described) while the control rod is in the neutral position. The upper extensions 140a and 140b of each spring 106a and 106b are then inserted into the respective biasing member slots 118a and 118b and the control rod is then allowed to center itself again is movement of the control rod was required when inserting the spring into the slots of the hub. Once the pump 40 has returned itself to neutral, the fasteners 116 can be tightened in the appropriate openings 132 in the hub 104.

Figure 17:
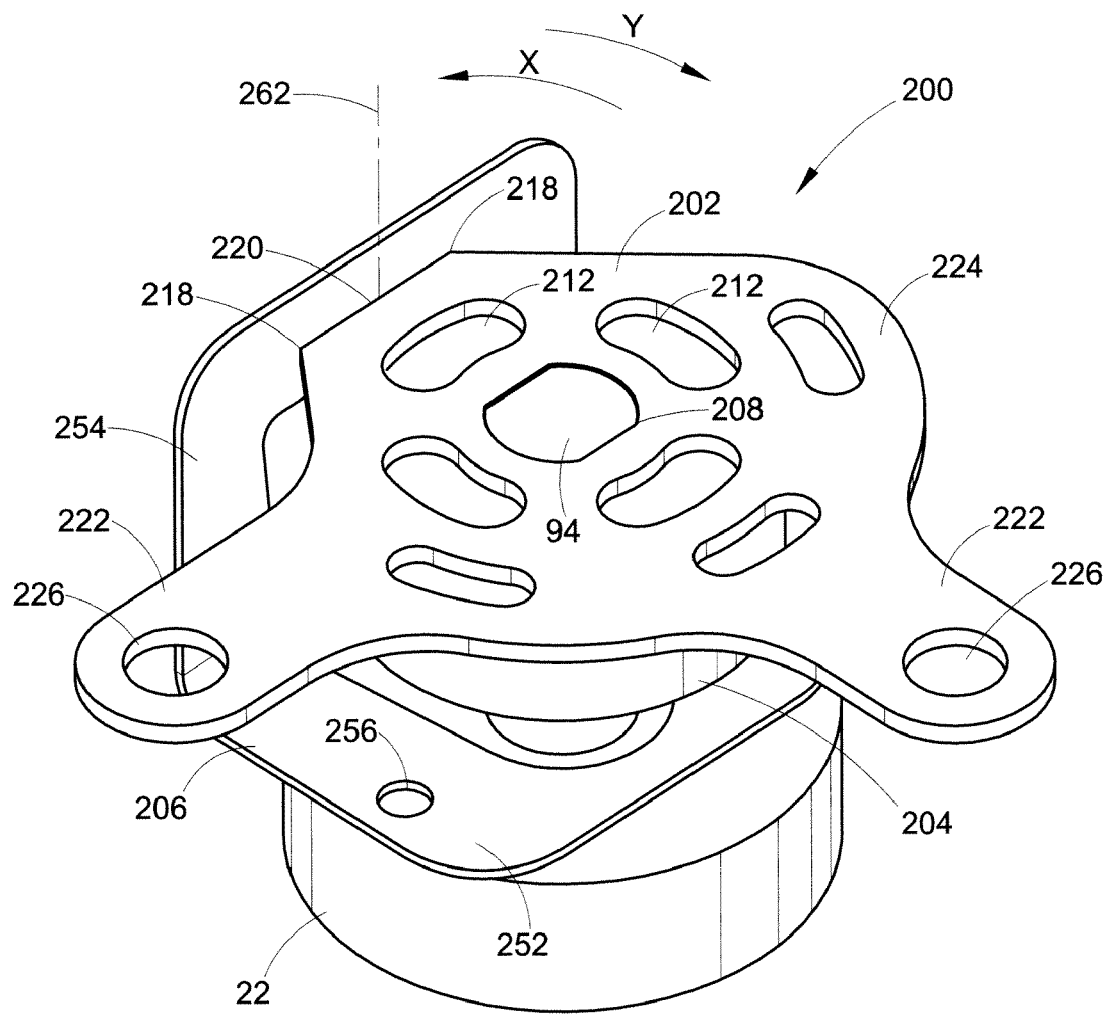
FIG. 17 is a perspective view of an alternative embodiment of a return-to-neutral mechanism for use with the pump unit depicted in FIGS. 1 and 2.

FIG. 17 depicts an alternative return-to-neutral mechanism 200 for returning a control rod back to neutral. FIG. 17 depicts a portion of the pump housing 22 with the control rod 94 (see also FIG. 1) extending through the housing. The control rod 96 (FIG. 1) would be operated in the same manner, and for the sake of brevity will not be described in more detail. As discussed above, the control rod 94 interfaces with the swash plate 54 (FIG. 2) to control the direction of flow of fluid through the pump 40 (FIG. 2) and the pressure at which the fluid is being delivered from the pump, which is a function of the size of the pump chambers 48 at a particular instance in time.

The return-to-neutral mechanism 200 in FIG. 17 includes a lever 202, a hub 204 and a biasing member 206. The lever 202 is similar to the lever 102 described above; the differences will be described in more detail below. The hub 204 is the same in configuration as the hub 104 described above. The biasing member 206 in this embodiment is a formed piece of spring steel, or similar resilient material.

With reference to FIG. 17, the lever 202 is configured to cooperate with the control rod, e.g. control rod 94, of a hydraulic pump, e.g. hydraulic pump 12, such that movement of the lever results in rotation of the control rod. The lever 202 includes an axially centered central opening 208 that receives the control rod 94, which interfaces with the swash plate 54. An extension may need to be provided on the control rod so that the lever 202 (and the hub 204) can receive the extension to connect to the control rod. Alternatively, the lever 202 can simply connect to the hub 204 and not include an opening that receives the control rod. Fastener slots, four slots 212 are shown in the figures, are radially offset from the central opening 208 and angularly spaced from one another (about 90 degrees on center). The fastener slots 212 are generally oblong with their centers generally following a constant radius (similar to the fastener slots 112 in FIG. 7) with respect to the center of the central opening 208. The lever 202 rests on, e.g. contacts, an upper face of the hub 204 and connects to the hub 204 using fasteners (not shown, but similar to the fasteners 116 in FIG. 3) that are received in the respective fastener slots 212 extending through the lever and are received in respective openings (not visible) formed in the hub 204.

The lever 202 also includes contacts 218 that contact the biasing member 206. The contacts 218 shown in FIG. 17 are small bumps, or protuberances, that extend from a flattened peripheral surface 220 of the lever. Cooperation of the lever 202 with the biasing member 206 will be described in more detail below.

The lever 202 includes a location configured to connect to a linkage that is connected to a steering mechanism of the prime mover that incorporates the hydraulic pump 12. Lever arms 222 extend radially outward from a generally circular body portion 224 of the lever 202. Distal openings 226 are provided at a distal end of each arm 222, respectively. The distal openings 226 provide an attachment location for attaching to a handle (not shown) through some sort of connection linkage (also not shown). The handle, or other steering device, is used to control the steering and speed of the vehicle. Bolts or hooks could also be provided at the attachment location for attaching to a handle (not shown) through some sort of connection linkage. Movement of the handle, or other steering device, by the operator will result in movement of the respective swash plate to control the direction and speed of the motor 16 that is in communication with the pump 40 of the pump unit 12. The return-to-neutral control mechanism 200 can also be used with other types of devices and should not be limited to only a device having handles used to control steering and speed of a vehicle, i.e. a zero-turn mower.

The hub 204 is configured to connect fast with the control rod 94 for rotation therewith. Also, the hub 204 connects to the lever 202 in a manner to allow for adjusting the lever with respect to the hub prior to fixing the hub with respect to the lever so that the hub rotates in response to movement of the lever. The hub 204 is the same in configuration as the hub 104 shown in FIGS. 9-12, therefore further description is not provided.

Figure 18:
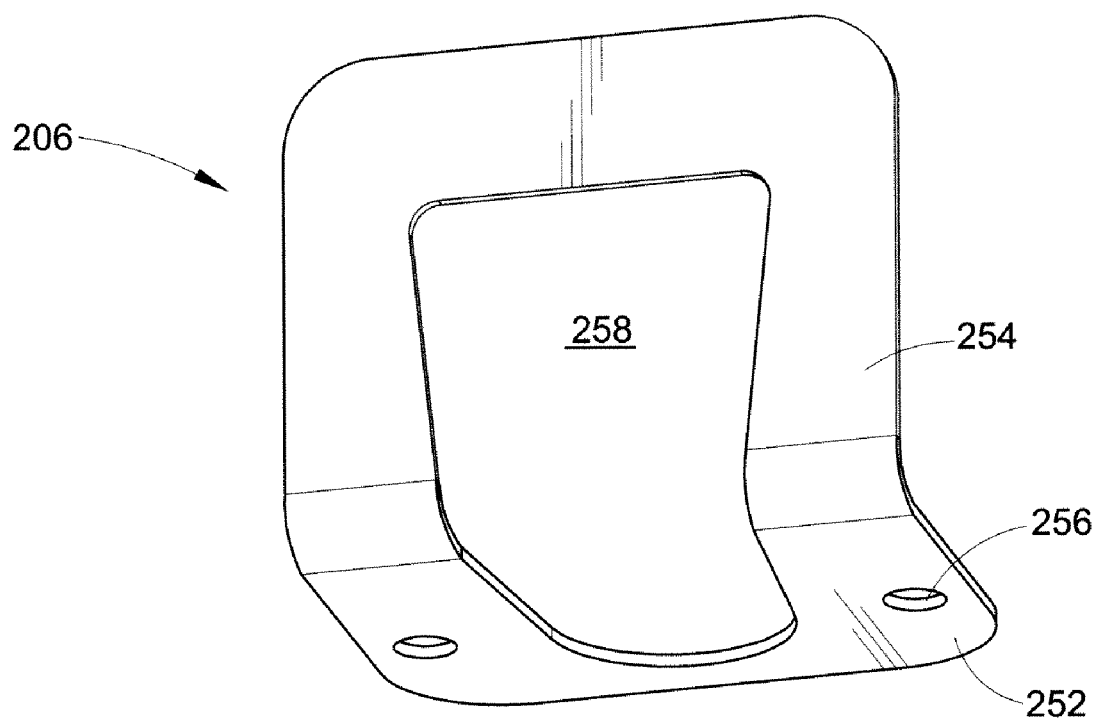
FIG. 18 is a rear perspective view of a biasing member of the return-to-neutral mechanism shown in FIG. 17.

The biasing member 206, which in the depicted embodiment of FIG. 17 is a formed piece of spring steel (or other resilient material), biases the lever 202, and thus the control rod, toward a neutral position, i.e. a position where pressurized fluid is not being delivered (or very little pressure is being delivered) to the hydraulic motors. The spring 206 is generally L-shaped having a first (lower) generally flat section 252 that rests on the pump housing 22 and a second (upright) generally flat section 254 that is generally at a right angle to the first generally flat section. Fastener openings 256 (only one is visible in FIG. 17) are provided in the lower section 252 that receive fasteners (not shown) to fix the spring 206 to the pump housing 22. As seen in FIG. 18, the spring can include a large central opening 258 through which the control rod 94 can extend.

When the lever 202 is rotated in the clockwise direction (arrow Y), which is accomplished by the operator moving the handle (or other device) in a first direction (for example to move the vehicle in a forward direction) the left contact 218 (per the orientation shown in FIG. 17) moves to force the upright section 254 of the spring 206 away from the rotational axis of the control rod 94. If the clockwise force is removed, e.g. if the operator lets go of the handle, then the spring 206 biases the lever 202 in a counterclockwise direction (arrow X) to return the lever 202, and thus the pump 40, (FIG. 1) to a neutral position. Similarly, when the lever 202 is rotated in the counterclockwise direction (arrow X), which is accomplished by the operator moving the handle (or other steering device) in a second direction (for example to move the vehicle in a reverse direction) the right contact 218 (per the orientation shown in FIG. 17) moves to force the upright section 254 of the spring 206 away from the rotational axis of the control rod 94. If the counterclockwise force is removed, then the spring 206 biases the lever 202 in a clockwise direction (arrow Y) to return the pump 40 (FIG. 1) to a neutral position.

Because the contacts 218 move toward the centerline 262 of the upright section 254 when the lever 202 rotates away from the neutral position, the biasing force acting on the lever 202 decreases as the lever 202 is moved toward a full throttle position. This is because the moment arm that is created between where the contact 218 acts against the spring 206 decreases as the contact 218 moves towards the centerline. Accordingly, the force that must be overcome by the operator to move the control rod toward a full throttle position (in either forward or reverse) decreases as the lever moves toward the full throttle position. This reduces operator fatigue as compared to other known return-to-neutral mechanisms. The handle on the prime mover and/or the pump 22 can include a stop, which are known in the art, to limit the movement of the lever 202 so that the stops 218 do not pass over the centerline 262 when being rotated toward the centerline. This precludes the lever 202 from getting stuck in the full throttle position by passing over center.

Because of the design of the return-to-neutral mechanism 200, "centering" the return-to-neutral mechanism is easily accomplished. The pump unit 12 to which the return-to-neutral mechanism 200 attaches typically self centers, i.e. operates in neutral, when the control rods 94 and 96 are not under a load, e.g. are not being rotated by an external force. Accordingly, with the motor M (FIG. 1) operating and rotating the driven shaft 44 of the first pump 40 (FIG. 1), the swash plates 54 and 84 will center to the neutral operating position. With the swash plates 54 and 84 in the neutral position, the spring 206 is attached to the pump housing 22. The hub 204 is then slid over the control rod 94 (another return-to-neutral mechanism can be mounted to the other control rod 96 in the same manner and therefore will not be described) while the control rod is in the neutral position. The control rod 94 is then allowed to center itself again. Once the pump 40 has returned itself to neutral, the fasteners can be tightened in the appropriate openings 212 in the lever 202 and in the hub 204.

Figure 19:
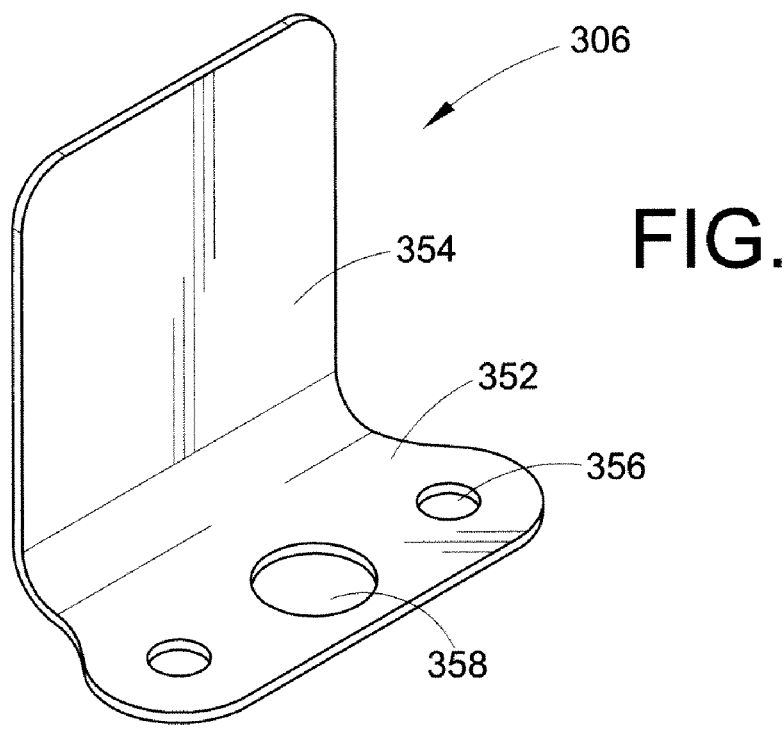
FIG. 19 is a front perspective view of a biasing member for use with a return-to-neutral mechanism such as the one shown in FIG. 17.

FIG. 19 depicts an alternative embodiment of a biasing member 306 that can be used in place of the biasing member 206 shown in FIGS. 17 and 18. The biasing member 306, which in the depicted embodiment of FIG. 19 is a formed piece of spring steel (or other resilient material), biases the lever 202, and thus the control rod, toward a neutral position, i.e. a position where pressurized fluid is not being delivered (or very little pressure is being delivered) to the hydraulic motors. The spring 306 is generally L-shaped having a first (lower) generally flat section 352 that rests on the pump housing 22 and a second (upright) generally flat section 354 that is generally at a right angle to the first generally flat section. Fastener openings 356 are provided in the lower section 352 that receive fasteners (not shown) to fix the spring 306 to the pump housing 22. The spring can include a central opening 358 through which the control rod 94 can extend.

Return-to-neutral mechanisms for use with a hydraulic pump have been described with particularity. The invention is not limited to only those embodiments described above. Instead, the disclosure described above is intended to include all modifications and alterations that come within the scope of the appended claims and the equivalents thereof.

The invention claimed is:

1. A return to neutral mechanism for a hydraulic pump comprising:
a lever configured to cooperate with a control rod of an associated hydraulic pump such that movement of the lever results in rotation of the control rod;
a hub configured to connect fast with the control rod for rotation therewith, the hub being connected to the lever in a manner to allow for adjusting the lever with respect to the hub prior to fixing the hub with respect to the lever so that the hub rotates in response to movement of the lever; and
a biasing member contacting the lever for biasing the control rod toward a neutral position when the control rod has been moved from the neutral position, wherein the biasing member is a curved piece of spring steel.

2. The mechanism of claim 1, wherein the lever includes a fastener slot and the hub includes a fastener opening, wherein the fastener slot is larger than the fastener opening.

3. A method for attaching a return to neutral mechanism to a control arm of a hydraulic pump, the method comprising:
operating a hydraulic pump in neutral;
connecting a hub fast to a control arm of the hydraulic pump such that the hub rotates with the control arm;
placing a lever on the hub;
contacting the lever with a biasing member having a coil axis parallel to a rotational axis of the lever;
allowing the control arm to return to a neutral position so that the hydraulic pump is operating in neutral; and
fixing the lever to the hub so that rotation of the lever results in rotation of the hub and the control arm.

4. The method of claim 3, wherein connecting the hub fast to a control arm further comprises inserting the control arm through an opening of the hub.

5. The method of claim 3, wherein placing a lever on the hub comprises inserting the control arm through an opening of the lever.

6. The method of claim 3, wherein contacting the biasing member with the lever includes connecting a first biasing member to the lever and the pump housing and connecting a second biasing member to the lever and the pump housing, wherein the first biasing member is configured to bias the lever in a first rotational direction and the second biasing member is configured to rotate the biasing member in a second rotational direction.

7. The method of claim 3, wherein fixing the lever to the hub further comprises rotating the lever with respect to the hub to align slots in the lever with openings in the hub, and inserting fasteners into the respective slots and openings.

8. A return to neutral mechanism for a hydraulic pump comprising:
a lever configured to cooperate with a control rod of an associated hydraulic pump such that movement of the lever results in rotation of the control rod;
a hub configured to connect fast with the control rod for rotation therewith, the hub being connected to the lever in a manner to allow for adjusting the lever with respect to the hub prior to fixing the hub with respect to the lever so that the hub rotates in response to movement of the lever;
a first biasing member contacting the lever for biasing the control rod in a first rotational direction toward a neutral position when the control rod has been moved from the neutral position; and
a second biasing member contacting the lever for biasing the control rod in a second rotational direction toward the neutral position when the control rod has been moved from the neutral position,
wherein each biasing member is a helical spring including a central coiled portion and an extension, the extension engages the lever and is substantially parallel to the rotational axis of the hub.

9. The mechanism of claim 8, wherein the lever includes at least three biasing member openings each configured to receive a respective extension.

10. The mechanism of claim 8, wherein the lever includes at least two biasing member openings, each biasing member opening being generally oblong.

11. The mechanism of claim 10, wherein the first biasing member deflects when the lever rotates in a first direction and the second biasing member is relaxed when the lever rotates in the first direction.

12. The mechanism of claim 8, wherein the lever includes a fastener slot and the hub includes a fastener opening, wherein the fastener slot is larger than the fastener opening.

13. The mechanism of claim 12, wherein the hub includes more fastener openings than the lever includes fastener slots.

14. The mechanism of claim 8, wherein the extension is parallel to a coil axis of the spring.

15. A return to neutral mechanism for a hydraulic pump comprising:
- a lever configured to cooperate with a control rod of an associated hydraulic pump such that movement of the lever results in rotation of the control rod, the lever including at least two generally oblong biasing member openings;
- a hub configured to connect fast with the control rod for rotation therewith, the hub being connected to the lever in a manner to allow for adjusting the lever with respect to the hub prior to fixing the hub with respect to the lever so that the hub rotates in response to movement of the lever;
- a first biasing member contacting the lever and received in one of the biasing member openings for biasing the control rod in a first rotational direction toward a neutral position when the control rod has been moved from the neutral position; and
- a second biasing member contacting the lever and received in another of the biasing member openings for biasing the control rod in a second rotational direction toward the neutral position when the control rod has been moved from the neutral position.

16. The mechanism of claim 15, wherein the first biasing member deflects when the lever rotates in the first direction and the second biasing member is relaxed when the lever rotates in the first direction.

17. The mechanism of claim 15, wherein each biasing member is a helical spring including a central coiled portion and an extension, the extension engages the lever and is substantially parallel to the rotational axis of the hub.

18. The mechanism of claim 17, wherein each biasing member is a helical spring including a central coiled portion defining a coil axis, which is parallel to the rotational axis of the hub.

* * * * *